United States Patent Office 3,051,725
Patented Aug. 28, 1962

3,051,725
TETRAPHTHALIMIDO AND TETRAMINO QUINONES
Kurt A. W. Wallenfels and Wilfried J. Draber, Freiburg, Breisgau, Germany, assignors to Farbwerke Hoechst Aktiengesellschaft vormals Meister Lucius & Bruning, Frankfurt am Main, Germany, a corporation of Germany
No Drawing. Filed July 12, 1960, Ser. No. 42,223
Claims priority, application Germany July 16, 1959
6 Claims. (Cl. 260—326)

We have found that it is possible to prepare the hitherto unknown 2,3,5,6-tetramino-benzoquinone-(1,4) by reacting potassium phthalimide with 2,3,5,6-tetrahalogeno-benzoquinone-(1,4) and subjecting the product so obtained to the action of hydrazine.

As 2,3,5,6-tetrahalogeno-benzoquinone-(1,4), there may be used fluoranil, chloranil, bromanil, and similar compounds. The reaction of the potassium phthalimide is carried out suitably by heating and with exclusion of moisture. As such solvent, there is suitable in the first instance acetonitrile. Furthermore, there may also be used: acetone, benzene, toluene, xylene. In solvents that have a low dielectric constant, the reaction proceeds only very slowly.

It is of advantage to carefully dry the solvent before the reaction, for example, by distillation over $P_2O_5$ or by similar measures. At first, there is obtained a finely crystalline substance which is very difficultly soluble in organic solvents. The compound, which is contaminated by dark colored by-products, is recovered in pure yellow state when subjected to repeated boiling with dimethylformamide. The yellow compound constitutes the tetra-(phthalimido)-benzoquinone.

By treatment with an aqueous hydrazine solution it is possible to convert the yellow tetra-(phthalimido)-benzoquinone into the corresponding tetramino-benzoquinone, it being suitable to use an excess of hydrazine. The reaction is effected by introducing the tetra-(phthalimido)-benzoquinone into an excess quantity of an aqueous hydrazine solution and by promoting the reaction by stirring or introducing inert gases, for example, nitrogen, or by shaking. At first, a violet precipitate appears which, however, dissolves again in the further course of the reaction so that an almost clear, greenish-brown solution is formed. When air is given access, bronze-lustering, olive green to black crystals immediately separate from this solution; this separation is completed by allowing the whole to stand, while occasionally shaking or stirring.

The 2,3,5,6-tetramino-benzoquinone-(1,4) obtained in this way is practically insoluble in solvents that have a low dielectric constant, for example, benzene, toluene, xylene, ether, and only difficultly soluble in other solvents, for example, alcohols, acetone, water. Above 260° C., the compound decomposes slowly. With strong inorganic acids, for example, concentrated hydrochloric acid, sulfuric acid or perchloric acid, it forms red to brown-red salts; with sulfuric acid, for example, there is formed an addition product having the composition $$C_6O_2(NH_2)_4 \cdot 1H_2SO_4$$

which is decomposed only slowly by water. The salts can be recrystallized from acid solutions. From these solutions the free tetramino-benzoquinone can be recovered in pure form with the aid of a sodium bicarbonate solution. The conversion into a salt and the regeneration with the bicarbonate solution may serve to purify the compound.

The 2,3,5,6-tetramino-benzoquinone-(1,4) is a valuable intermediate product that may be used, for example, for the manufacture of pharmaceutically valuable compounds and dyestuffs. Above all it is suitable, for example, as intermediate product for the manufacture of pharmaceutically active imidazol compounds, as, for example, those described in Belgian Patent 575,680.

The following examples serve to illustrate the invention but they are not intended to limit it thereto:

Example 1

(a) 8.5 grams of fluoranil and 32 grams of dry potassium phthalimide are refluxed for 3 hours in 200 cc. of acetonitrile freshly distilled over phosphorus-pentoxide. The hot reaction mixture is then filtered with suction, and the residue is washed first with acetonitrile until the filtrate has become colorless and then with water. The yellow-brown residue is once boiled up shortly with dimethylformamide and the hot solution is filtered with suction. There are obtained about 28 grams of a yellow, finely crystalline product which constitutes the 2,3,5,6-tetra-(phthalimido)-benzoquinone-(1,4).

(b) 5 grams of the tetra-(phthalimido)-benzoquinone obtained according to the prescription given under (a) are shaken, for 4 hours and in an atmosphere of nitrogen, in a solution of 20 cc. of hydrazine hydrate (of 80% strength) in 250 cc. of water. At first, a violet precipitate forms which, however, redissolves to a great extent thereby forming an almost clear, greenish-brown solution. When air is given access, bronze-lustering, olive-green to black crystals separate at once. The separation of the precipitate is completed by allowing the reaction mixture to stand on the air while occasionally shaking it. Sometimes short heating to 50–80° C. may be necessary. After some time the whole is vacuum filtered. There are obtained about 0.5 gram (35% referred to the fluoranil) of a crystalline compound constituting the 2,3,5,6-tetramino-benzoquinone-(1,4).

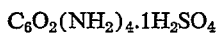—$C_6H_8N_4O_2$: Calculated, C=42.87; H=4.78; N=33.31. Found, C=42.60; H=4.89; N=32.65.

For purification, the crude product is dissolved in warm, concentrated sulfuric acid, the solution is filtered through a glass frit and poured onto ice. The brown-red addition product of sulfuric acid separating out is introduced, after isolation, into a saturated bicarbonate solution; the tetramino-benzoquinone thereby precipitates in crystalline form. The compound decomposes slowly at a temperature above 260° C.

Example 2

(a) 50.0 grams of chloranil and 151 grams of potassium phthalimide are boiled for five hours, while stirring intensively and under exclusion of moisture, in 1 liter of anhydrous acetonitrile. The solution turns green. It is allowed to cool and is then vacuum filtered. The residue is suspended in ½ liter of water at 90° C. and then again filtered with suction. This operation is repeated twice. The mass is then suspended in 1 liter of ethanol, shortly boiled up and vacuum filtered in hot state. It is then dried in the desiccator at 105° C. There are obtained 115 grams (82% of the theory) of tetra-(phthalimido)-benzoquinone in the form of a yellow-green to brown-yellow powder, which is insoluble in the usual solvents.

Analysis.—$C_{38}H_{16}N_4O_{10}$ (688.25): Calculated, C=66.25; H=2.34; N=8.1. Found, C=65.95; H=2.61; N=7.4.

The infrared spectrum reveals bands at 1820 and 1765 cm.$^{-1}$ typical for diacylamino groupings (as, for example, in the phthalimide). Another band at 1690 cm.$^{-1}$ is probably due to quinone-carbonyl groups.

(b) 100 grams of the substance prepared by the method described under (a) are shaken for five hours together with 600 ml. of water and 400 ml. of hydrazine hydrate (80% strength). The temperature of the reaction mixture thereby increases slightly (30–40° C.).

The whole is then filtered with suction and washed twice with each time 500 ml. of water and three times with each time 100 ml. of ethanol. The tetra-(amino)-quinone is obtained in the form of black needles that have metallic luster and decompose at temperatures above 260° C. The yield is 19.0 grams (63% of the theory, referred to the chloranil).

For purification, 20.0 grams of most finely pulverized tetra-(amino)-quinone, 40.6 grams of SnCl·2H$_2$O and 100 ml. of concentrated hydrochloric acid are shaken for 3 hours under an atmosphere of nitrogen. The whole is then filtered with suction, washed with a small quantity of cold concentrated hydrochloric acid and twice with each time 50 ml. of absolute methanol. The tetrahydrochloride is obtained as brownish powder; it is dried over P$_2$O$_5$ and NaOH and is then stable in air. The yield of tetraaminohydroquinone-tetrahydrochloride is 34.5 grams (91% of the theory).

The compound can be purified by dissolving it in as small a quantity as possible of warm air-free water and precipitating it by adding four to five times the quantity of concentrated hydrochloric acid. By repeating this operation several times, there is obtained an only slightly pink colored product which in dried state is stable in air.

The reoxidation of the tetraamino-hydroquinone can be carried out according to the following methods:

(a) 0.055 gram of the tetraaminohydroquinone-tetrahydrochloride so obtained is dissolved in 10 ml. of boiled-out water and titrated under an atmosphere of nitrogen with 0.1—NNaOH until a pH value of 7 is determined by spot tests. The whole is then shaken with access of air. The solution turns rapidly dark while the tetraamino-quinone separates in the form of needles having metallic luster. Yield: 0.028 gram (95% of the theory).

(b) 5.0 grams of the tetraaminohydroquinone-tetrahydrochloride described above are dissolved in 80 ml. of boiled-out warm water and added with a hot solution of 5.0 grams of FeCl$_3$ in 100 ml. of concentrated hydrochloric acid. There forms an orange red precipitate which, after cooling, is filtered with suction and washed with a small quantity of hydrochloric acid. It is then dried over P$_2$O$_5$ and NaOH. Yield: 3.7 grams (96% of the theory). The infrared spectrum of this compound is identical with that of the HCl-addition product with tetraaminoquinone.

Analysis.—C$_6$H$_{10}$N$_4$O$_2$Cl$_2$ (241.08): Calculated, C=29.89; H=4.18; N=23.25. Found, C=29.64, H=4.42; N=23.22.

We claim:
1. The compound tetramino-benzoquinone.
2. The compound tetraphthalimido-benzoquinone.
3. A compound of the formula

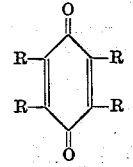

wherein R represents a member of the class consisting of amino and phthalimido.

4. The method of making tetraphthalimido-benzoquinone which comprises heating tetrahalogeno-benzoquinone with potassium phthalimide in an inert solvent.

5. The method of making tetramino-benzoquinone which comprises contacting tetraphthalimido-benzoquinone with aqueous hydrazine.

6. The method of making tetramino-benzoquinone which comprises heating tetrahalogeno-benzoquinone with potassium phthalimide in an inert solvent to form tetraphthalimido-benzoquinone, recovering said tetraphthalimido benzoquinone, and then contacting it with aqueous hydrazine, whereby tetramino-benzoquinone is formed.

References Cited in the file of this patent

Noller: Chemistry of Organic Compounds, p. 553 (Saunders), (1957).